United States Patent
Pai et al.

(10) Patent No.: US 10,171,306 B2
(45) Date of Patent: Jan. 1, 2019

(54) AUTOMATIC DISCOVERY AND PROVISIONING OF MULTI-CHASSIS ETHERCHANNEL PEERS

(71) Applicant: Cisco Technology, Inc., San Jose, CA (US)

(72) Inventors: Nalinaksh M. Pai, San Ramon, CA (US); Sanjay Kumar Hooda, Cupertino, CA (US); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 14/632,070

(22) Filed: Feb. 26, 2015

(65) Prior Publication Data

US 2016/0254960 A1    Sep. 1, 2016

(51) Int. Cl.
*H04L 12/24* (2006.01)
*H04L 12/721* (2013.01)
*H04L 12/931* (2013.01)
*H04L 12/933* (2013.01)

(52) U.S. Cl.
CPC .......... *H04L 41/12* (2013.01); *H04L 41/0806* (2013.01); *H04L 41/0886* (2013.01); *H04L 45/66* (2013.01); *H04L 49/15* (2013.01); *H04L 49/351* (2013.01); *H04L 49/65* (2013.01)

(58) Field of Classification Search
None
See application file for complete search history.

(56) References Cited

U.S. PATENT DOCUMENTS

| 8,204,061 | B1 | 6/2012 | Sane et al. | |
|---|---|---|---|---|
| 2011/0274114 | A1* | 11/2011 | Dhar | H04L 49/70 370/401 |
| 2012/0173694 | A1* | 7/2012 | Yan | H04L 12/4641 709/223 |
| 2013/0250829 | A1* | 9/2013 | Kurokawa | H04L 12/12 370/311 |
| 2013/0339475 | A1* | 12/2013 | Kataria | H04L 45/46 709/217 |

(Continued)

OTHER PUBLICATIONS

International Search Report dated May 24, 2016 cited in Application No. PCT/US2016/019156, 12 pgs.

(Continued)

*Primary Examiner* — Jason E Mattis
*Assistant Examiner* — Hong Shao
(74) *Attorney, Agent, or Firm* — Merchant & Gould P.C.

(57) ABSTRACT

Methods and system are disclosed which can simplify the configuration of a MCEC in a fabric environment such that is may become automatic. Furthermore, centralized identities (such as a host tracking database and/or a network controlled) may be employed to detect the presence of a MCEC. Requiring the creation of direct links between network devices participating in the MCEC may be avoided. Furthermore, logical L2 fabric connectivity (over a L3 fabric underlay) may be utilized to provide dual homing active-active services without additional configuration, as the tracking of peer network devices may be performed in a centralized manner. For example, a host tracking database or a network controller may be employed for peer tracking.

15 Claims, 5 Drawing Sheets

(56) References Cited

U.S. PATENT DOCUMENTS

2014/0189094 A1* 7/2014 Ditya ................... H04L 45/245
709/224
2014/0314095 A1* 10/2014 Saltsidis ................ H04L 47/41
370/394
2016/0218918 A1* 7/2016 Chu .................... H04L 41/0803

OTHER PUBLICATIONS

CISCO: "Best Practices in Deploying Cisco Nexus 1000V Series Switches on Cisco UCS B and C Series Cisco UCS Manager Servers," White Paper Apr. 2011, pp. 1-36, XP-002709631, retrieved from the Internet: URL:http://www.cisco.com/en/US/prod/collateral/switches/ps9441/ps9902/white_paper_c11-558242.pdf.

* cited by examiner

US 10,171,306 B2

AUTOMATIC DISCOVERY AND PROVISIONING OF MULTI-CHASSIS ETHERCHANNEL PEERS

TECHNICAL FIELD

The present disclosure relates generally to network configuration and management, specifically, automatic configuration and detection of multi-chassis ether-channel devices.

BACKGROUND

In fabric based networks (such as Application Centric Infrastructure (ACI), campus network solutions, VxLAN-based data center networks, etc.), there is a desire to simplify to role of network administrators for configuration and management of the networks. For example, classical L2 network devices, such as switches and hosts may be "multi-homed" to more than one fabric edge node to eliminate network connectivity as a potential single point of failure in the network. Prior attempted solutions may achieve this through a multi-chassis ether-channel (MCEC) approach, such as virtual port channels (VPC) or Distributed Resilient Network Interconnect (DRNI) applications.

A classical L2 network device may think that the port channel is connected to the same overall system, whereas in reality there are multiple systems coordinating to look like one system from the port channel's perspective. Such prior implementations of MCEC require configuration at both ends by a network administrator to set up the port channel. Furthermore, a L2 link may need to be set up between participating peer devices. Additionally, the fabric edge peers may need to use the same switch identifier (or IP addresses) when forwarding a packet that has arrived at the port-channel to the fabric. Such an approach may result in a single switch view for the rest of the fabric. These prior approaches require complex multiple configurations in order to provide multi-homed connectivity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
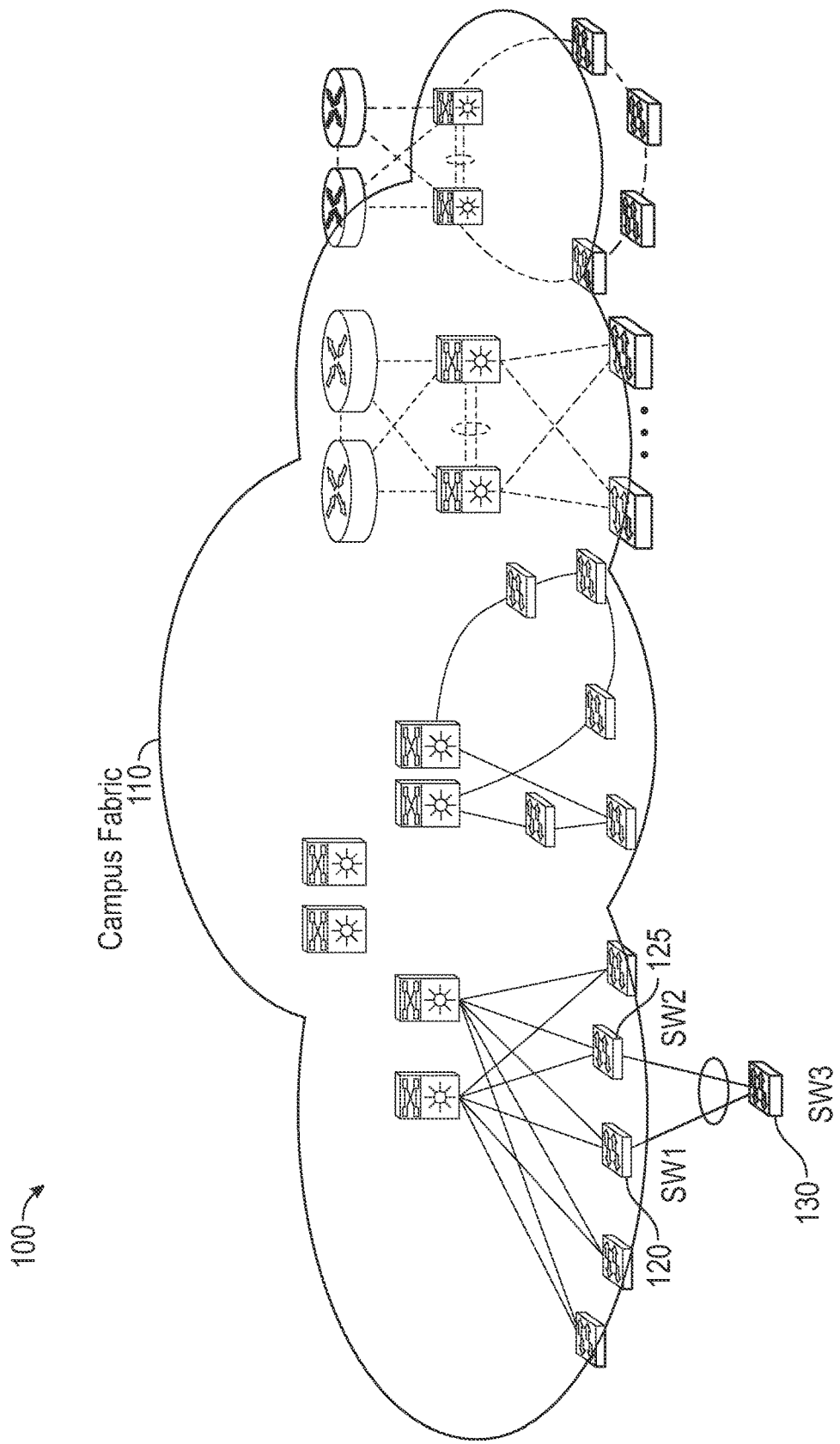
FIG. 1 illustrates a sample network topology where embodiments of the present disclosure may be performed.

Methods and system are disclosed which can simplify the configuration of a MCEC in a fabric environment such that is may become automatic. Furthermore, centralized identities (such as a host tracking database and/or a network controlled) may be employed to detect the presence of a MCEC. Such embodiments may avoid requiring the creation of direct links between network devices participating in the MCEC. Furthermore, logical L2 fabric connectivity (over a L3 fabric underlay) may be utilized to provide dual homing active-active services without additional configuration, as the tracking of peer network devices may be performed in a centralized manner. For example, a host tracking database or a network controller may be employed for peer tracking.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates a sample campus fabric network topology that will be used in the following description to illustrate embodiments of the present disclosure. The described network topology may exist in a networking environment 100. While networking environment 100 is depicted as a wired network environment, a wireless network environment is also consistent with embodiments of the disclosure. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or wireless networks suitable for packet-type communications, such as Internet communications.

Networking environment 100 may be designed to comprise a campus fabric 110. Fabric 110 may consist of an underlay and an overlay. The underlay may handle the connectivity between any number of network devices in fabric 110. The overlay may deal with user traffic entering fabric 110. Fabric 110 may be capable of providing Layer-2 (L2) and Layer-3 (L3) services on top of the underlay.

Traffic may enter fabric 110 through fabric edge nodes. For example, here traffic may enter fabric through fabric edge node 120 and fabric edge node 125. Fabric edge node 120 and fabric edge node 125 may be responsible for encapsulating packets in the traffic. Network device 130 may reside outside of fabric 110 and be in communication with fabric edge node 120 and fabric edge node 125.

Packets may be encapsulated with a fabric header that contains the address of the egress fabric edge node. When a packet arrives at the fabric egress node, the fabric header may be removed from, the packet. The now-native packet may then be forwarded according to the destination address contained in the packet's original header.

Fabric edge node 120 and fabric edge node 125 may peer with one another to create a MCEC group. Such peering may not require a L2 link to be established between fabric edge node 120 and fabric edge node 125. Instead, L2 services over fabric 110 may be leveraged for configuration of the peers. In order to avoid user-specified configurations, fabric edge node 120 and fabric edge node 125 need to automatically discover one another for peering.

Fabric edge node 120 and fabric edge node 125 become "peered" if they are connected to the same "system." For example, when applying Link Aggregation Control Protocol (LACP), a classical L2 network device that wants to aggregate links may send a LACP data unit containing an identifier for the "system." If individual links terminate on two different fabric edge nodes (e.g., from fabric edge node 120 and fabric edge node 125), then for the MCEC to be formed, the two different fabric edge nodes may need to discover that they are connected to the same system identified in the LACP data unit. In some embodiments, a protocol may employ a broadcast service over fabric 110 to identify other fabric edge nodes that may connect to the same identified system. However, in large-scale fabrics, the number of fabric edge node could reach a number that makes such broadcast service unwieldy.

Figure 2:
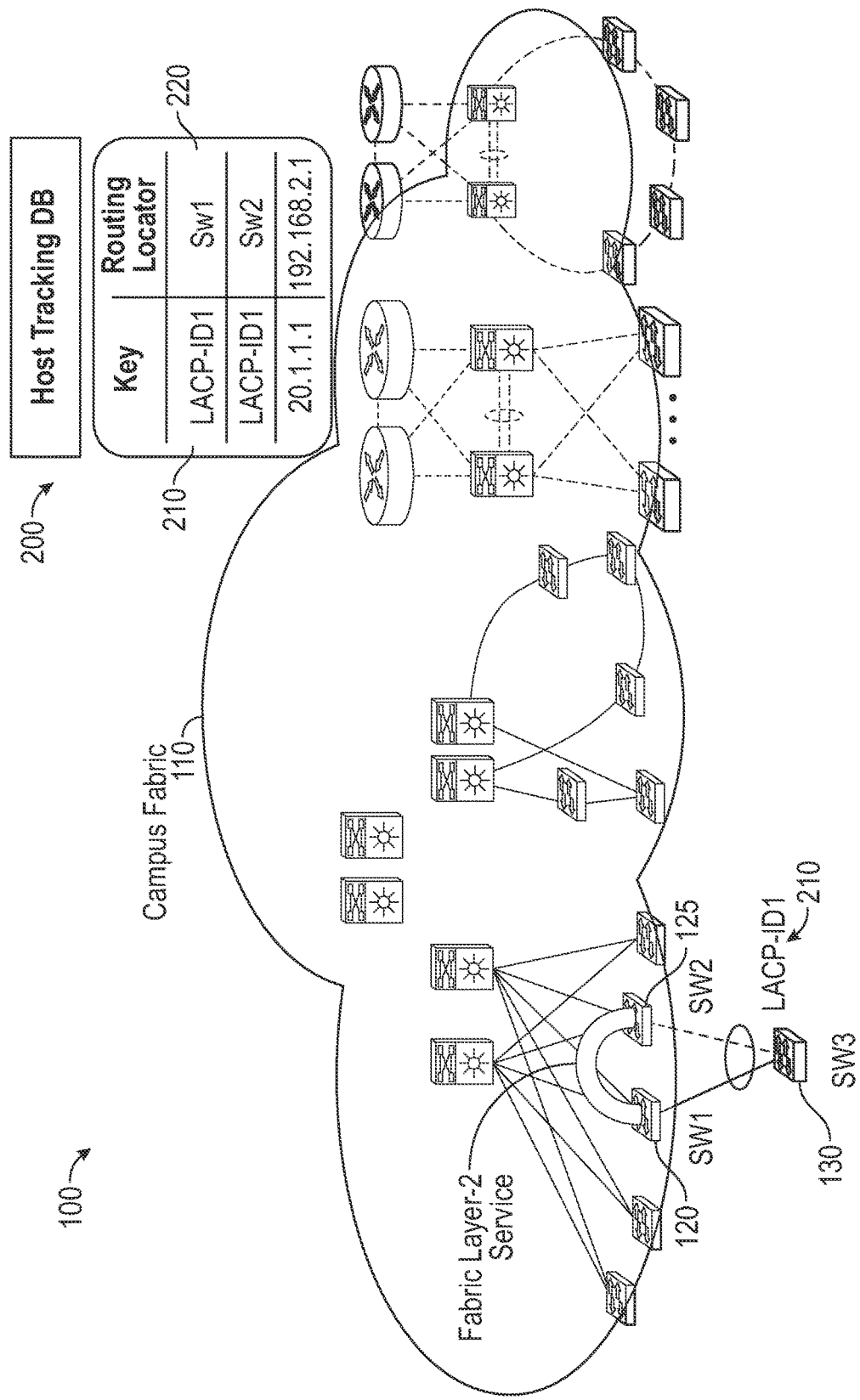
FIG. 2 illustrates a sample network topology where embodiments of the present disclosure may be performed.

Turning to FIG. 2, embodiments of networking environment 100 are illustrated in the context of using system identifiers and a centralized host tracking database 200. In some embodiments of the present disclosure, host tracking database 200 (or in some embodiments, a network controller) may be leveraged to provide a centralized tracking of host attachments throughout fabric 110.

In some embodiments, host tracking database 200 may be extended through the following described steps. First, when a fabric edge node (e.g., fabric edge node 120) detects the presence of a LACP system in the classical L2 domain, the fabric edge node may register the LACP system identifier (e.g., key 210) and a unique fabric address associated with the fabric edge node (e.g., routing locator 220). In some embodiments, routing locator 220 may correspond to an IP address in the underlay of fabric 110.

Next, the fabric edge node may query host tracking database 200 to locate other fabric edge nodes that have registered their connectivity to the same identified system. In the case that the fabric edge node locates other fabric edge nodes, the fabric edge node may use L2 services available on fabric 110 to communicate across fabric 110 that the MCEC protocol has been initiated to form the multi-chassis etherchannel. In some embodiments, the MCEC protocol may be DRNI.

Embodiments of the present disclosure may also be implemented on a network controller. One such network controller may be an Application Policy Infrastructure Controller Enterprise Module (APIC-EM).

Further embodiments may be implemented through Locator/ID Separation Protocol (LISP) commands. For example, LISP Map-Register, LISP Map-Request, and LISP Map-Reply may be employed to identify other fabric edge nodes that have registered their connectivity to the same identified system. The LISP Map-Register message may be A LISP message sent from a fabric edge node to a Map-Server to register its associated endpoint identifier (EID) prefixes. In addition to the set of EID prefixes to register, the Map-Register message includes one or more routing locators (RLOCs) to be used by the Map-Server when forwarding Map-Requests. The Map-Server may be requested by a fabric edge node to answer Map-Requests on its behalf by setting a "proxy Map-Reply" flag in the message.

In some embodiments of the present disclosure, a fabric edge node may detect the LACP system identifier. Upon detection, the fabric edge node may register the LACP system identifier against the fabric edge node's unique RLOC as an EID using the Map-Register message. Next, the fabric edge node may query the mapping system for other RLOCs that have registered the same EID. The L2 services of fabric 110 may be used to initiate contact with network devices associated with the other RLOCs.

Networking environment 100 may be designed to transmit a stream of data packets from one network device to other network devices. Networking environment 100 may comprise any number of network devices both inside and outside the confines of fabric 110. Network devices may be routers, bridges, fabric edge nodes, or other network devices capable of receiving and transmitting a data stream from a source network device to a destination network device. Specifically, in embodiments of the present disclosure any of the described network devices may operate the disclosed embodiments of the present disclosure. Similarly, host tracking database 200 may be found on a network device within networking environment 100. Network devices generally are discussed in further detail in regards to FIG. 3.

Figure 3:
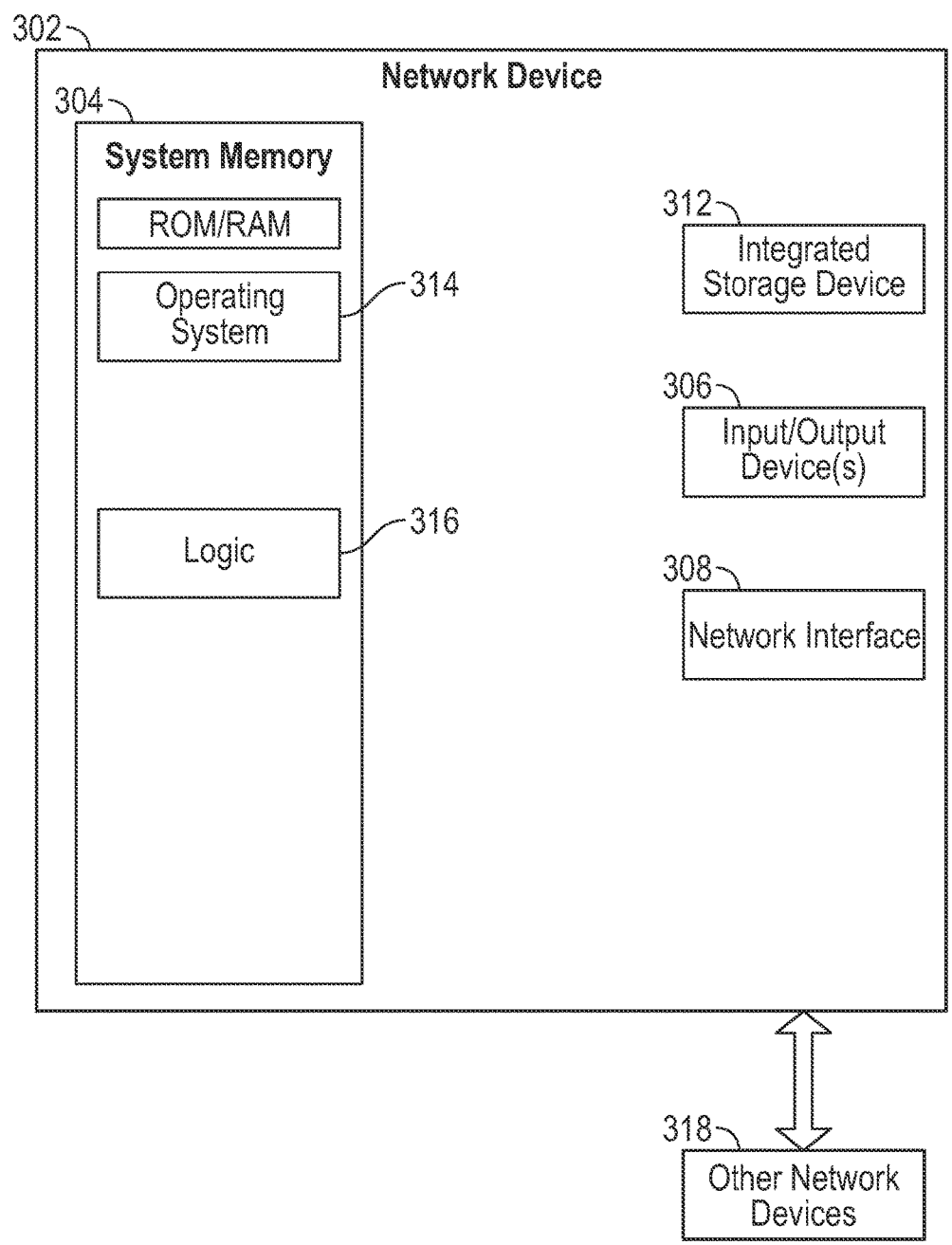
FIG. 3 shows a network device in greater detail.

FIG. 3 shows a network device (such as fabric edge node 120) in greater detail. A network device may include a processing device 302, a memory 304, input/output (I/O) devices 306, and a network interface 308, each of which may be communicatively coupled via a local interface (not shown). Processing device 302 may be a hardware device for executing software, particularly that which is stored in memory 304. Processing device 302 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 302 may include software at least capable of operating described embodiments of the present disclosure.

Network interface 308 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 306 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 310 may include address, control, and/or data connections to enable appropriate communications among the aforementioned components and provides the interface to communicate with a network controller, a host tracking database, a fabric edge router, or any number of other network devices in networking environment 100.

In some embodiments, a network device may further be configured with an integrated storage device 312 coupled to local interface 310. Storage device 312 may be configured to buffer a plurality of data packets. One or more such buffers may be dedicated buffers for storing captured packets. In some embodiments, storage device 312 may be externally coupled to a content server (not shown).

Memory 304 may include a suitable operating system (O/S) 314. Operating system 314 essentially may control the execution of other computer programs, such as scheduling, input-output control, file and data management, memory management, and communication control and related services. Logic 316 may include executable code to send service requests to the network controller, a host tracking database, a fabric edge router, or any number of other network devices in networking environment 100.

Memory 304 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 304 may incorporate electronic, magnetic, optical, semi-conductive, and/or other types of storage media. Note that memory 304 may have a distributed architecture, where various components are situated remotely from one another, which can be accessed by the processing device 302.

The software in memory 304 may include one or more separate programs, each of which comprises an ordered listing of executable instructions for implementing logical functions. In the embodiment shown in FIG. 3, the software in memory 304 may include operating system 314 and logic 316, as explained above. Functionality of logic 316 may be implemented using a single module, or distributed among a plurality of modules.

When logic 316 is in operation, processing device 302 may be configured to execute logic 316 stored within memory 304, to communicate data to and from memory 304, and to generally control operations of logic 316. Logic 316 and O/S 314, in whole or in part, but typically the latter, are read by processing device 302, perhaps buffered within processing device 302, and then executed.

The network controller may include a communication interface suitable for enabling communication (e.g., TCP/IP) of data packets with other network devices 218 of network environment 100. For instance, the communication interface may be of a type suitable for communication over an IP network, a coaxial cable network, an HFC network, and/or wireless network, among others.

Figure 4:
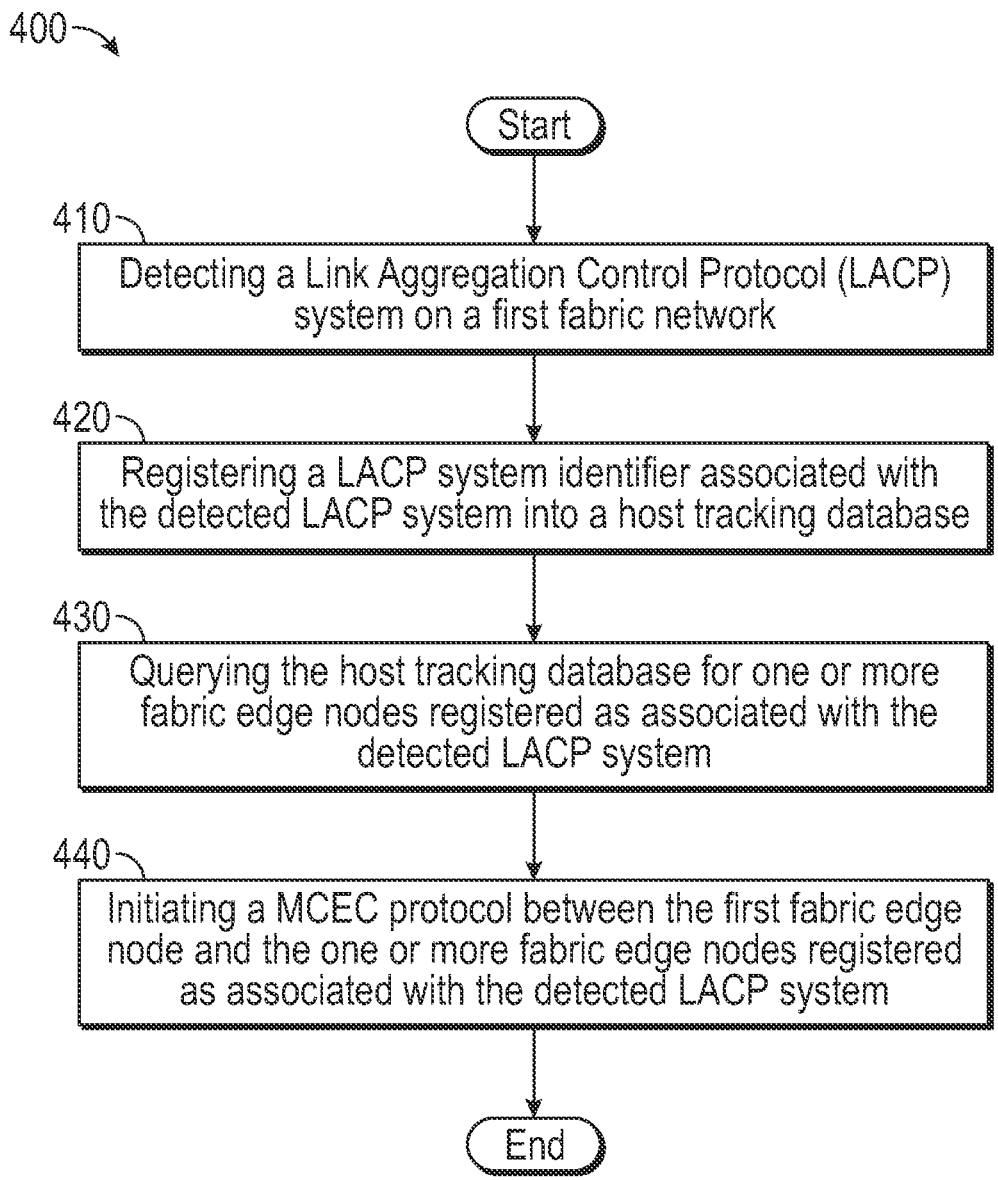
FIG. 4 is a flow chart illustrating embodiments of the present disclosure.

Having described various components of certain embodiments of network environment 100, a method 400 implemented by one or more network devices employed on network environment 100 will now be described with reference to FIG. 4. Method 400 may begin at step 410 where a Link Aggregation Control Protocol (LACP) system may be detected on a first fabric network. In some embodiments, the first fabric may be one of ACI, campus network solutions, or VxLAN-based data center networks.

Next, method 400 may proceed to step 420. At step 420, a LACP system identifier associated with the detected LACP system may be registered into a host tracking database. In some embodiments of the present disclosure, the LACP system identifier may be registered in conjunction with a unique fabric address associated with a first fabric edge node. In some embodiments of the present disclosure, the unique fabric address may correspond to an IP address in an underlay of the first fabric network.

Method 400 may then proceed to step 430 where the host tracking database may be queried for one or more fabric edge nodes registered as associated with the detected LACP system. Method 400 may next proceed to step 440. At step 440, a MCEC protocol may be initiated between the first fabric edge node and the one or more fabric edge nodes registered as associated with the detected LACP system. In some embodiments of the present disclosure, the MCEC protocol may be DRNI. In some embodiments of the present disclosure, MCEC protocol is initiated by L2 services of the first fabric network. In some embodiments of the present disclosure, the MCEC protocol is initiated through a network controller. The network controller may be an APIC-EM.

Figure 5:
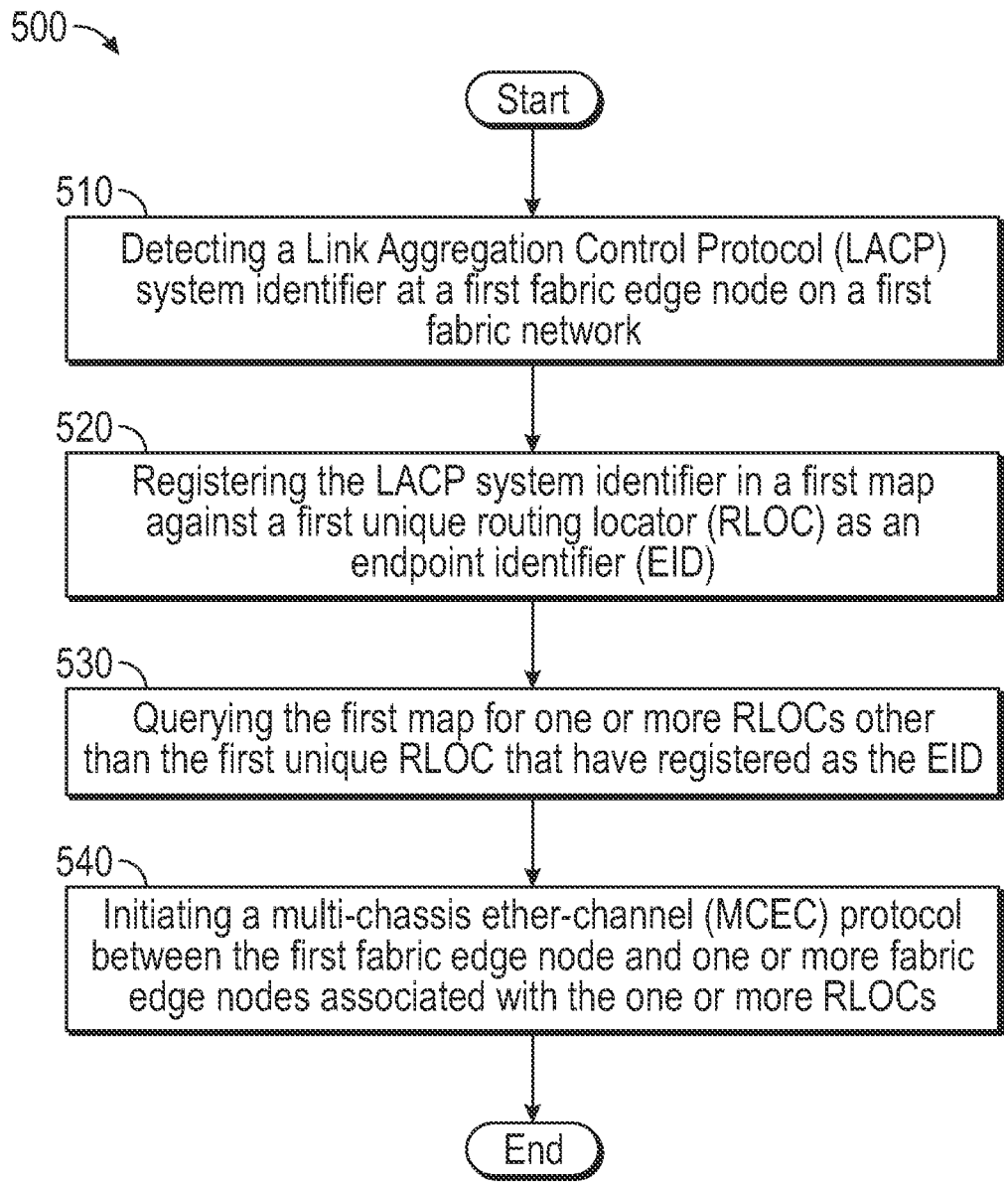
FIG. 5 is a flow chart illustrating embodiments of the present disclosure.

A method 500 implemented by one or more network devices employed on network environment 100 will now be described with reference to FIG. 5. Method 500 may begin at step 510 where a Link Aggregation Control Protocol (LACP) system identifier may be detected at a first fabric edge node on a first fabric network. In some embodiments of the present disclosure, the LACP system identifier may be registered using a LISP Map-Register message.

In some embodiments of the present disclosure, the LISP Map-Register message may be sent from the first fabric edge node to a Map-Server to register its associated endpoint identifier prefixes. A LISP Map-Server may comprise a network device that may learn of EID-Prefix mapping entries from a fabric edge node, via the registration mechanism. The Map-Server may map these EID-Prefixes in a mapping database, such as a host tracking database.

In some embodiments of the present disclosure, the LISP Map-Register message may include one or more RLOCs to be used by the Map-Server when forwarding one or more LISP Map-Requests. Such a LISP Map-Register message may request the Map-Server to answer the one or more LISP Map-Requests on behalf of the first fabric edge node by setting a flag in the LISP Map-Register message.

Method 500 may then proceed to step 520. At step 520, the LACP system identifier may be registered in a first map against a first unique routing locator (RLOC) as an endpoint identifier (EID). Next, at step 530, the first map may be queried for one or more RLOCs other than the first unique RLOC that have registered as the EID.

Method 500 may then proceed to step 540 where a multi-chassis ether-channel (MCEC) protocol may be initiated between the first fabric edge node and one or more fabric edge nodes associated with the one or more RLOCs.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   detecting, by a first fabric edge node, a presence of a Link Aggregation Control Protocol (LACP) system on a first fabric network, wherein the first fabric edge node and a second fabric edge node are not connected via a direct Layer-2 peering link;
   registering, by the first fabric edge node in response to detecting the presence of the LACP system, a LACP system identifier comprising a key associated with the detected LACP system into a host tracking database, wherein the LACP system identifier is registered in conjunction with a unique fabric address associated with the first fabric edge node;
   querying, by the first fabric edge node in response to detecting the presence of the LACP system, the host tracking database;
   determining, by the first fabric edge node in response to querying the host tracking database, that the second fabric edge node is registered in the host tracking database as being associated with the detected LACP system; and
   initiating, by the first fabric edge node in response to determining that the second fabric edge node is registered in the host tracking database, peering over the first fabric network via a fabric Layer-2 service using a multi-chassis ether-channel (MCEC) between the first fabric edge node and the second fabric edge node.

2. The method of claim 1, wherein the first fabric network is an Application Centric Infrastructure (ACI).

3. The method of claim 1, wherein the first fabric network is a VxLAN-based data center network.

4. The method of claim 1, wherein the unique fabric address corresponds to an IP address in an underlay of the first fabric network.

5. The method of claim 1, wherein the MCEC protocol is Distributed Resilient Network Interconnect (DRNI).

6. The method of claim 1, wherein the multi-chassis ether-channel (MCEC) protocol is initiated by Layer-2 (L2) services of the first fabric network.

7. A system comprising:
   a memory;
   a processor disposed in a first fabric edge node, the processor capable of executing instructions stored on the memory, the instructions comprising:
   detecting a presence of a Link Aggregation Control Protocol (LACP) system on a first fabric network, wherein the first fabric edge node and a second fabric edge node are not connected via a direct Layer-2 peering link;
   registering, in response to detecting the presence of the LACP system, a LACP system identifier associated with the detected LACP system into a host tracking database, wherein the LACP system identifier is registered in conjunction with a unique fabric address associated with a first fabric edge node;
   querying, in response to detecting the presence of the LACP system, the host tracking database;
   determining, in response to querying the host tracking database, that the second fabric edge node is registered in the host tracking database as being associated with the detected LACP system; and
   initiating, in response to determining that the second fabric edge node is registered in the host tracking database, peering over the first fabric network via a fabric Layer-2 service using a multi-chassis ether-channel (MCEC) between the first fabric edge node and the second fabric edge node.

8. The system of claim 7, wherein the first fabric network is an Application Centric Infrastructure (ACI).

9. The system of claim 7, wherein the first fabric network is a VxLAN-based data center network.

10. The system of claim 7, wherein the unique fabric address corresponds to an IP address in an underlay of the first fabric network.

11. The system of claim 7, wherein the MCEC protocol is Distributed Resilient Network Interconnect (DRNI).

12. The system of claim 7, wherein the multi-chassis ether-channel (MCEC) protocol is initiated by Layer-2 (L2) services of the first fabric network.

13. The method of claim 1, wherein registering, the LACP system identifier comprises registering the LACP system identifier via a Locator/ID Separation Protocol (LISP) command.

14. The method of claim 1, wherein first fabric network is configured to provide a Layer-2 and a layer-3 service.

15. The system of claim 7, wherein the first fabric network is a campus network.

* * * * *